3,826,844
CERTAIN DITHIOKETALS OF GLYOXYLOYL HALIDE-1-PHENYLHYDRAZONE AS ANTI-ARTHROPODAL AGENTS

Malcolm W. Moon, Kalamazoo, Mich., assignor to The Upjohn Company, Kalamazoo, Mich.
No Drawing. Filed Nov. 27, 1970, Ser. No. 93,497
Int. Cl. A01n *9/12*
U.S. Cl. 424—327                              11 Claims

ABSTRACT OF THE DISCLOSURE

Some new cyclic and noncyclic dithioketals of glyoxyloyl halide 1-phenylhydrazones have been found to be effective anti-arthropodal agents. The cyclic dithioketals include 5-membered and 6-membered rings with or without alkyl substituents. The noncyclic dithioketals are limited to alkyl on the sulfur atoms. The phenyl group can have alkyl, alkoxy, haloalkyl, alkylmercapto, and halogen substituents. The "halide" can be chloride or bromide. Formulations for use against arthropod pests are described as well as methods for controlling such pests wherever they occur and become a problem.

STATEMENT OF THE INVENTION

This invention pertains to new organic chemical compounds, formulations comprising the same, and a new method for controlling arthropod pests. The invention is more particularly directed to new cyclic and noncyclic dithioketals of glyoxyloyl halide 1-phenylhyrazones, formulations comprising the new compounds and diluent carriers which facilitate application, and a new method for controlling arthropod pests (for example, insects and mites) with the new compounds.

SUMMARY OF SUBJECT MATTER

The new cyclic and noncyclic dithioketals of glyoxyloyl halide 1-phenylhydrazones of this invention have the following general structural formula:

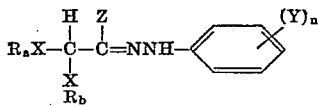

wherein $R_a$ and $R_b$ are independently lower-alkyl of from 1 to 4 carbon atoms, inclusive, and collectively (taken together) constitute a lower-alkyl substituted or unsubstituted ethylene or trimethylene group having a total of from 2 to 9 carbon atoms, inclusive; Y is selected from the group consisting of halogen, lower-alkyl of from 1 to 4 carbon atoms, inclusive, lower-haloalkyl of from 1 to 4 carbon atoms, inclusive, lower-alkoxy of from 1 to 4 carbon atoms, inclusive, and lower-alkylmercapto of from 1 to 4 carbon atoms, inclusive; n is an integer from 0 to 5, inclusive; Z is chlorine or bromine; and X is a sulfur group, i.e., sulfur (—S—), sulfinyl

or sulfonyl

The new compounds of this invention, the cyclic and noncyclic dithioketals of glyoxyloyl halide 1-phenylhydrazones according to Formula I, above, are prepared from corresponding glyoxyloyl halide 1-phenylhydrazones by conventional acid catalyzed condensation of lower-alkylmercaptans or alkanedithiols on the carbonyl carbon. Acid catalysts commonly used are hydrochloric acid, p-toluenesulfonic acid, and boron trifluoride etherate. The latter two catalysts have their individual advantages and are preferred. The p-toluenesulfonic acid is cheaper than the boron trifluoride etherate, but requires higher reaction temperatures. Consequently, when low boiling lower-alkylmercaptans are utilized in the formation of the dithioketals of the invention, boron trifluoride etherate is preferred. This catalyst functions at 0° C., i.e., below the boiling point of methylmercaptan. When boron trifluoride etherate is used the reaction solution retains the water produced by the condensation, whereas physico-chemical removal of the water, e.g., azeotropy, is advantageous when p-toluenesulfonic acid catalyst is used. A general discussion of thioketal formation is available in Fieser and Fieser, Reagents for Organic Synthesis, p. 356 (John Wiley and Sons, Inc., 1967).

Reaction media useful in the condensation include organic solvents benzene, chloroform, carbon tetrachloride, methanol and the like. If desired, an excess of boron trifluoride etherate can be used as the reaction medium. When the reaction is completed the desired cyclic and noncyclic dithioketals of glyoxyloyl halide 1-phenylhydrazone are recovered in accordance with conventional procedures, e.g., by addition of ether and cooling to induce crystallization, or by removing the organic solvent by evaporation under reduced pressure. The compounds are purified by conventional recrystallization from solvents such as technical hexane, ethyl acetate, methyl ethyl ketone, methylene chloride, and the like.

DETAILED DESCRIPTION OF THE INVENTION

In the general Formula I the variables $R_a$, $R_b$, X, Y, Z, and n are shown and generally defined. The structural formula and the variables, as defined, are the contemplated scope of operable embodiments of this invention. Certain combinations of these variables have been embodied in specific compounds of the invention that have been actually prepared and tested. Still other as yet unprepared combinations of the variables are contemplated as operable embodiments of the invention. The defined scope is believed to be realistic in view of general chemical knowledge, and the activities of the specific compounds already prepared and tested.

In this general Formula I, the substituents groups $R_aX$ and $R_bX$ are to be considered independent of each other unless otherwise indicated by the nature of the reactants and prospective products. Accordingly, the general formula is intended to show that one X can be sulfur itself, while the other X can be sulfur itself, sulfinyl, or sulfonyl. Similarly, for example $R_a$ can be methyl while $R_b$ can be methyl, ethyl, or other lower-alkyl of up to 4 carbon atoms.

When $R_a$ and $R_b$ are taken together as a unit, a cyclic dithioketal is obtained that according to the definition is dithiolane, dithiane, or lower-alkyl substituted forms thereof. Illustratively, besides ethylene and trimethylene, $R_a$ and $R_b$ taken together can be propylene, 2-ethyltrimethylene, propylethylene, n-butylethylene, 1,2-diethylethylene, 1,3-dipropyltrimethylene, and 1,2,3-trimethyltrimethylene.

Thus considered, the novel compounds of this invention, cyclic and noncyclic dithioketals of glyoxyloyl chloride 1-phenylhydrazones, constitute a relatively closely related area of organic chemistry having a characterizing arrangement of primary elements and some variations among interchangeable groups. The scope of the relatively closely related area of organic chemistry can be more readily visualized by considering some specific examples of the variables.

$R_a$ and $R_b$ for example, being independently lower-alkyl of from 1 to 4 carbon atoms, inclusive, means methyl, ethyl, propyl, and butyl, including the isomeric forms thereof. $R_a$ and $R_b$ taken together is exemplified above.

Similarly, Y means the halogens—chlorine, bromine, iodine, and fluorine; the lower-alkyl groups as defined; lower-alkoxy, for example, methoxy, ethoxy, propoxy, and butoxy, including the isomeric forms thereof; lower-haloalkyl, for example, trifluoromethyl, chloromethyl, dibromomethyl, 2-chloroethyl, 1,2-dichloroethyl, 2-iodoethyl, 2,2,2-trifluoroethyl, 3-chloro-n-propyl, 2-bromo-n-propyl, iodoisopropyl, 1,3,3-tribromobutyl, 2,3-dichlorobutyl, and the like; and lower-alkylmercapto, for example, methylmercapto, ethylmercapto, propylmercapto, and butylmercapto, including isomeric forms thereof.

The glyoxyloyl halide 1-phenylhydrazone starting compounds for preparing the new cyclic and noncyclic dithioketals of this invention are prepared according to conventional methods. For example, a 1,2,3-butanetrione-2-phenylhydrazone can be directly chlorinated (according to the general method described by Chattaway and Ashworth, J. Chem. Soc., p. 930 (1934) for chlorinating 2,3,4-pentanetrione 3-phenylhydrazones) to give glyoxyloyl chloride 1-[(2,4-dichlorophenyl)hydrazone]. Similarly, mesoxaldehyde 2-(p-tolyl)hydrazone can be directly chlorinated to give glyoxyloyl chloride 1-[(2-chloro-p-tolyl)hydrazone]. The foregoing direct chlorinations give chlorine substitution on reactive sites of the benzene ring.

The method described by Dieckman and Platz, Chem. Ber., *38*, p. 2987 (1905) is applicable generally for the synthesis of glyoxyloyl halide 1-phenylhydrazones. According to this method 2-chloromalonaldehyde is reacted with a benzenediazonium chloride in an aqueous medium containing sodium acetate. The desired glyoxyloyl chloride 1-phenylhydrazone precipitates and is recovered and purified by recrystallization. Glyoxylol bromide 1-phenylhydrazones are prepared by substituting 2-bromomalonaldehyde in the reaction.

The compounds of Formula I wherein X is

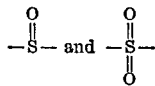

are prepared from the corresponding sulfides of Formula I by oxidation with an oxidizing agent, for example, peracetic acid, perbenzoic acid, and the like.

Compounds according to Formula I wherein X is

are conveniently prepared by using one molar equivalent of peracetic acid for one molar equivalent of the corresponding Formula I sulfide. Similarly, the corresponding compounds according to Formula I wherein X is

are prepared by using at least two molar equivalents of an oxidizing agent.

The oxidation reaction is accomplished by adding an organic solution of peracetic acid (preferably about 10% to about 30% concentration) to an organic solution of the sulfide. Suitable organic solvents include ethyl acetate, acetone, methylene chloride, acetic acid and the like. The peracetic acid solution is added slowly with stirring in order to avoid localized generation of undesirable high temperatures in the mixture. After allowing adequate time for completion of the reaction, the thus produced cyclic or noncyclic dithioketal of glyoxyloyl halide 1-phenylhydrazone oxide is recovered and purified by conventional techniques such as filtration, solvent extraction and evaporation, and crystallization.

Various embodiments of this invention are described in the following detailed preparations and examples. Other embodiments will be apparent to those skilled in the arts involved. Accordingly, this invention is to be measured according to the whole disclosure and the scope of the appended claims, including the preferred embodiments specified herein.

EXAMPLE 1

Preparation of 1,3-Dithiolane-2-Carbonyl Chloride (2,4-Dichlorophenyl)Hydrazone

Part A.—1,2,3-Butanetrione 2-phenylhydrazone: One mole (23.0 g.) sodium metal was added, with stirring, to a mixture consisting of 73 ml. acetone, 81 ml. (1.0 mole) ethyl formate, and 1 l. diethyl ether. This reaction mixture was set aside at 25° C. for 18 hrs. A precipitate formed which was the sodium salt of acetoacetaldehyde. The precipitate was collected on a filter and the filter cake was washed with about 300 ml. diethyl ether. The washed precipitate was then dissolved in 400 ml. 80% aqueous ethanol, and this solution was mixed with a solution of benzene diazonium chloride (1 mole) in about 1500 ml. of water. (The benzene diazonium chloride was prepared by mixing a chilled aqueous solution of 93.2 g. aniline and 220 ml. concentrated hydrochloric acid with a solution of 69 g. sodium nitrite in water.) An orange precipitate formed which was collected on a filter. The filter cake was recrystallized from absolute ethanol to give 82.0 g. of 1,2,3-butanetrione 2-phenylhydrazone. A second recrystallization from ethanol gave an analytical sample of 1,2,3-butanetrione 2-phenylhydrazone having a melting point at 122° to 125° C.

*Analysis.*—Calcd. for $C_{10}H_{10}N_2O_2$: C, 63.15; H, 5.30; N, 14.73. Found: C, 63.18; H, 5.34; N, 14.64.

Part B.—Glyoxyloyl chloride 1-[2,4-dichlorophenyl)hydrazone]: A solution consisting of 19 g. (0.1 mole) 1,2,3-butane-trione 2-phenylhydrazone (Part A, above) in 200 ml. chloroform chilled to minus 40° C. was treated with 16 ml. (0.35 mole) chlorine while being thoroughly stirred. This reaction mixture was allowed to warm to 25° C., and the chloroform and excess chlorine were removed by evaporation. An oily residue was obtained which was chromatographed through a silica gel column using a mixture of equal parts benzene and technical hexane as the solvent phase. After removing the solvent by evaporation under reduced pressure there was obtained 6.2 g. of glyoxyloyl chloride 1-[(2,4-dichlorophenyl)hydrazone]. An analytical sample having a melting point at 113° to 114.5° C. was obtained by two recrystallizations from ethyl acetate.

*Analysis.*—Calcd. for $C_8H_5Cl_3N_2O$: C, 38.20; H, 2.00; Cl, 42.29; N, 11.14. Found: C, 38.28; H, 2.49; Cl, 42.74; N, 11.11.

Part C.—1,3-Dithiolane-2-carbonyl chloride (2,4-dichlorophenyl)hydrazone: To a solution consisting of 4.8 g. (0.019 mole) glyoxyloyl chloride 1-[(2,4-dichlorophenyl)hydrazone] (Part B, above) and 2.8 ml. (0.033 mole) ethanedithiol was added, with stirring, 2 ml. boron trifluoride etherate. After continued stirring for 10 min., the reaction mixture was diluted with 50 ml. diethyl ether and chilled to −60° C. A solid separated. The solids were collected on a filter and the solids on the filter were recrystallized first from ethanol and then from technical hexane (Skellysolve B, a mixture of isomeric hexanes boiling at 140° to 160° F.). There was thus obtained 1,3-dithiolane-2-carbonyl chloride (2,4-dichlorophenyl)hydrazone having a melting point at 87° to 90° C.

*Analysis.*—Calcd. for $C_{10}H_9Cl_3N_2S_2$: C, 36.65; H, 2.77; Cl, 32.46; N, 8.55; S, 19.57. Found: C, 36.90; H, 3.03; Cl, 32.44; N, 8.35; S, 19.33.

EXAMPLE 2

Preparation of 1,3-Dithiolane-2-Carbonyl Chloride (2-Chloro-p-Tolyl)Hydrazone

Part A.—Mesoxaldehyde 2-(p-tolyl)hydrazone: A mixture consisting of 104 g. (0.5 mole) 1,1,3,3-tetraethoxypropane, 2 l. water, and 5 ml. concentrated hydrochloric acid was continuously stirred for 18 hrs. at 25° C. A freshly prepared aqueous solution of p-tolyl diazonium chloride was then added with stirring [the aqueous p-tolyl diazonium chloride solution having been prepared by adding an aqueous solution of 17.5 g. (0.25 mole) sodium nitrite in 50 ml. water to a continually stirred mixture of p-toluidine (26.8 g., 0.25 mole), concentrated hydrochloric acid (60 ml., 0.6 mole), and ice-cold water (500 ml.)]. An anqueous solution of sodium acetate (200 g. in 500 ml. water) was added, and after 30 min. the solids that had precipitated were collected on a filter. The filter cake was washed with water and dried in air. There was thus obtained 48 g. of mesoxaldehyde 2-(p-tolyl)hydrazone.

Part B.—Glyoxyloyl chloride 1-[(2-chloro-p-tolyl)hydrazone]: A sample (19.6 g., 0.1 mole) of mesoxaldehyde 2-(p-tolyl)hydrazone (Part A, above) was dissolved in 250 ml. chloroform, the solution was chilled to minus 40° C., and 11.5 ml. (0.25 mole) elemental chlorine was added. The reaction mixture was allowed to warm to 25° C. and after an interval of 30 min. the chloroform was removed by evaporation under reduced pressure. The oily concentrate that remained was dissolved in benzene and chromatographed through a column of silica gel. After collecting the eluate and removing the solvent, there was obtained 7.5 g. of glyoxyloyl chloride 1-[(2-chloro-p-tolyl)hydrazone].

Part C.—1,3-Dithiolane-2-carbonyl chloride (2-chloro-p-tolyl)hydrazone: A reaction solution consisting of 4.0 g. (0.017 mole) glyoxyloyl chloride 1-[(2-chloro-p-tolyl)hydrazone], 2 ml. (0.024 mole) ethanedithiol, 2 ml. boron trifluoride etherate, and 10 ml. chloroform was stirred continuously for 15 min. After diluting the reaction mixture with 100 ml. technical hexane, the diluted organic solution was first washed with two 100 ml. portions of water, then washed with two 100 ml. portions of 2N aqueous sodium hydroxide, and finally washed with two 100 ml. portions of water. The chloroform and technical hexane were then removed by evaporation under reduced pressure to give an oily residue. The residue was dissolved in a solvent mixture consisting of 3 parts benzene and 7 parts technical hexane, and the solution was chromatographed through a column of silica gel. After collecting the eluate and removing the solvents there was obtained 2.25 g. of 1,3-dithiolane-2-carbonyl chloride (2-chloro-p-tolyl)hydrazone. Two recrystallizations from technical hexane gave an analytical sample having a melting point at 76.5° to 78.5° C.

*Analysis.*—Calcd. for $C_{11}H_{12}Cl_2N_2S_2$: C, 43.00; H, 3.94; Cl, 23.08; N, 9.12; S, 20.87. Found: C, 42.98; H, 3.78; Cl, 23.33; N, 9.35; S, 20.53.

EXAMPLE 3

Preparation of 1,3-Dithiolane-2-Carbonyl Chloride (4,6-Dichloro-o-Tolyl)Hydrazone Part A.—Mesoxaldehyde 2-(o-tolyl)hydrazone: Following the procedure of Example 2, Part A, but substituting o-toluidine for p-toluidine, there was prepared mesoxaldehyde 2-(o-tolyl)hydrazone.

Part B.—Glyoxyloyl chloride 1-[(4,6-dichloro-o-tolyl) hydrazone]: Following the procedure of Example 2, Part B, but substituting mesoxaldehyde 2-(o-tolyl)hydrazone for mesoxaldehyde 2-(p-tolyl)hydrazone and using 3 molar equivalents of chlorine instead of 2.5 molar equivalents, there was prepared glyoxyloyl chloride 1-[(4,6-dichloro-o-tolyl)hydrazone.

Part C.—1,3-Dithiolane-2-carbonyl chloride (4,6-dichloro-o-tolyl)hydrazone: Following the procedure of Example 2, Part C, but substituting glyoxyloyl chloride 1-[(4,6-dichloro-o-tolyl)hydrazone] for glyoxyloyl chloride 1-[(2-chloro-p-tolyl)hydrazone] there was prepared 1,3-dithiolane-2-carbonyl chloride (4,6-dichloro-o-tolyl)hydrazone having a melting point at 69° to 71° C.

*Analysis.*—Calcd. for $C_{11}H_{11}Cl_3N_2S_2$: C, 38.66; H, 3.25; Cl, 31.13; N, 8.20; S, 18.77. Found: C, 38.78; H, 3.21; Cl, 31.49; N, 8.02; S, 18.98.

EXAMPLE 4

Preparation of 1,3-Dithiolane-2-Carbonyl Chloride (2,4,6-Trichloro-m-Tolyl)Hydrazone Part A.—Mesoxaldehyde 2-(m-tolyl)hydrazone: Following the procedure of Example 2, Part A, but substituting m-toluidine for p-toluidine, there was prepared mesoxaldehyde 2-(m-tolyl)hydrazone.

Part B.—Glyoxyloyl chloride 1 - [(2,4,6 - trichloro-m-tolyl)hydrazone]: Following the procedure of Example 2, Part B, but substituting mesoxaldehyde 2-(m-tolyl)hydrazone for mesoxaldehyde 2-(p-tolyl)hydrazone and using 4 molar equivalents of chlorine, there was prepared glyoxyloyl chloride 1-[2,4,6-trichloro-m-tolyl)hydrazone].

Part C.—1,3-Dithiolane-2-carbonyl chloride (2,4,6-trichloro-m-tolyl)hydrazone: Following the procedure of Example 2, Part C, but substituting glyoxyloyl chloride 1-[(2,4,6-trichloro-m-tolyl)hydrazone] for glyoxyloyl chloride 1-[(2-chloro-p-tolyl)hydrazone], there was prepared 1,3-dithiolane - 2 - carbonyl chloride (2,4,6-trichloro-m-tolyl)hydrazone having a melting point at 110° to 112° C.

*Analysis.*—Calcd. for $C_{11}H_{10}Cl_4N_2S_2$: C, 35.12; H, 2.68; Cl, 37.70; N, 7.45; S, 17.05. Found: C, 35.19; H, 2.72; Cl, 37.86; N, 7.72; S, 16.82.

EXAMPLE 5

Bis(Methylthio)Acetyl Chloride (2,4,6-Trichloro-m-Tolyl)Hydrazone

Following the procedure of Example 2, Part C, but substituting methanethiol for ethanedithiol, and substituting glyoxyloyl chloride 1-[(2,4,6-trichloro-m-tolyl)hydrazone] for glyoxyloyl chloride 1-[(2-chloro-p-tolyl)hydrazone], there was prepared bis(methylthio)acetyl chloride (2,4,6-trichloro-m-tolyl)hydrazone having a melting point at 90° to 92° C.

*Analysis.*—Calcd. for $C_{11}H_{12}Cl_4N_2S_2$: C, 34.93; H, 3.20; Cl, 37.50; N, 7.41; S, 16.96. Found: C, 35.03; H, 3.20; Cl, 37.53; N, 7.39; S, 16.31.

EXAMPLE 6

Preparation of 1,3-Dithiolane-2-Carbonyl Chloride (6-Chloro-$\alpha,\alpha,\alpha$-Trifluoro-m-Tolyl)Hydrazone A solution consisting of 9.65 g. (0.1 mole) 2-chloromalonaldehyde and 0.1 mole 6-chloro-$\alpha,\alpha,\alpha$-trifluoro-m-toluene diazonium chloride [prepared by conventional reaction of 6-chloro-$\alpha,\alpha,\alpha$-trifluoro-m-toluidine (19.5 g., 0.1 mole) and sodium nitrite (6.9 g., 0.1 mole) in the presence of concentrated hydrochloric acid] and water was added with stirring to an aqueous solution of sodium acetate (40.8 g., 0.3 mole). After several hours, the precipitate that had formed was collected on a filter. The filter cake was recrystallized from ethanol to give glyoxyloyl chloride 1-[(6-chloro-$\alpha,\alpha,\alpha$-trifluoro-m-tolyl)hydrazone].

This compound was dithioketalized by reaction with ethanedithiol as described in Example 1, Part C, to give the desired 1,3-dithiolane-2-carbonyl chloride (6-chloro-$\alpha,\alpha,\alpha$-trifluoro-m-tolyl)hydrazone.

EXAMPLE 7

Following the procedure of Example 1, but substituting propane - 1,2 - dithiol, propane - 1,3 - dithiol, 2,3-butanedithiol, methylmercaptan, ethylmercaptan, isopropylmercaptan and butylmercaptan for ethanedithiol, there are prepared the corresponding compounds:

4-methyl-1,3-dithiolane-2-carbonyl chloride (2,4-dichlorophenyl)hydrazone,
1,3-dithiane-2-carbonyl chloride (2,4-dichlorophenyl)-hydrazone,
4,5-dimethyl-1,3-dithiolane-2-carbonyl chloride (2,4-dichlorophenyl)hydrazone, bis-(methylthio)acetyl chloride (2,4-dichlorophenyl)-hydrazone,
bis-(ethylthio)acetyl chloride (2,4-dichlorophenyl)-hydrazone,
bis-(isopropylthio)acetyl chloride (2,4-dichlorophenyl)hydrazone, and
bis(butylthio)acetyl chloride (2,4-dichlorophenyl)hydrazone, respectively.

EXAMPLE 8

Following the procedure of Example 6, but substituting benzenediazonium chloride, 2,4,6-triiodobenzene diazonium chloride, m-toluenediazonium chloride, 3,5-xylene-diazonium chloride, o-butylbenzenediazonium chloride, o-methoxybenzenediazonium chloride, p-methylmercaptobenzenediazonium chloride, 2,3,4,5 - tetramethylbenzenediazonium chloride, and 2 - isopropyl - p - toluenediazonium chloride, for 6 - chloro - $\alpha,\alpha,\alpha$ - trifluoro-m-toluenediazonium chloride there were prepared:

1,3-dithiolane-2-carbonyl chloride phenylhydrazone,
1,3-dithiolane-2-carbonyl chloride (2,4,6-triiodophenyl)hydrazone,
1,3-dithiolane-2-carbonyl chloride (m-tolyl)hydrazone,
1,3-dithiolane-2-carbonyl chloride (3,5-xylyl)hydrazone,
1,3-dithiolane-2-carbonyl chloride (o-butylphenyl)hydrazone,
1,3-dithiolane-2-carbonyl chloride o-anisyl hydrazone,
1,3-dithiolane-2-carbonyl chloride (p-methylmercaptophenyl)hydrazone,
1,3-dithiolane-2-carbonyl chloride (2,3,4,5-tetramethylphenyl)hydrazone, and
1,3-dithiolane-2-carbonyl chloride (2-isopropyl-p-tolyl)hydrazone, respectively.

EXAMPLE 9

Following the procedure of Example 6, but substituting 2-bromomalonaldehyde for the 2-chloromalonaldehyde, there is prepared 1,3-dithiolane-2-carbonyl bromide (6-chloro-$\alpha,\alpha,\alpha$-trifluoro-m-tolyl)hydrazone.

EXAMPLE 10

Following the procedure of Example 2, Part C, but substituting glyoxyloyl chloride 1-phenylhydrazone,
glyoxyloyl chloride 1-(o-chlorophenyl)hydrazone,
glyoxyloyl chloride 1-[(2-chloro-p-tolyl)hydrazone],
glyoxyloyl chloride 1-[(4,6-dichloro-o-tolyl)hydrazone],
glyoxyloyl chloride 1-[(2,5-dichloro-m-anisyl)hydrazone],
glyoxyloyl chloride 1-[(6-bromo-$\alpha,\alpha,\alpha$-trifluoro-m-tolyl)hydrazone],
glyoxyloyl chloride 1-[(2,6-dichloro-4-methylmercaptophenyl)hydrazone],
glyoxyloyl chloride 1-[(6-chloro-3,4-xylyl)hydrazone], for glyoxyloyl chloride 1-[2-chloro-p-tolyl)hydrazone] and substituting methanethiol for ethanedithiol, there are prepared bis(methylthio)acetyl chloride phenylhydrazone,
bis(methylthio)acetyl chloride (o-chlorophenyl)hydrazone,
bis(methylthio)acetyl chloride (2-chloro-p-tolyl)hydrazone,
bis(methylthio)acetyl chloride (4,6-dichloro-o-tolyl)hydrazone,
bis(methylthio)acetyl chloride (2,5-dichloro-m-anisyl)hydrazone,
bis(methylthio)acetyl chloride (6-bromo-$\alpha,\alpha,\alpha$-trifluoro-m-tolyl)hydrazone,
bis(methylthio)acetyl chloride (2,6-dichloro-4-methylmercaptophenyl)hydrazone, and
bis(methylthio)acetyl chloride (6-chloro-3,4-xylyl)hydrazone, respectively.

The anti-arthropodal cyclic and noncyclic dithioketals of glyoxyloyl halide 1-phenylhydrazones of Formula I can be used as the pure compounds, such as those described in the Examples, or as technical grade compounds from commercial production; but for practical reasons, the compounds are preferably formulated as anti-arthropodal compositions. More particularly, the cyclic and noncyclic dithioketals of glyoxyloyl halide 1-phenylhydrazones are preferably formulated with a diluent carrier. There are many different kinds of diluent carriers useful for preparing antiarthropodal compositions. For example, dispersible carriers are commonly used in the insecticide and miticide arts. Such carriers may or may not include adjuvants such as wetting agents, emulsifying agents, stickers, and other components that indirectly promote efficacy.

For example, pesticidal compositions useful against arthropod pests can be formulated as dusts, wettable powders, emulsifiable concentrates, aqueous dispersions, solutions, and flowable creams for application to animals and foliage, seeds or other parts of plants. Formulations suitable for systemic infusion can be made, and granular compositions can be made and applied to soil or on surfaces where arthropod pests might congregate. Moreover, the cyclic and noncyclic dithioketals of glyoxyloyl halide 1-phenylhydrazones of the invention can be the sole active agent in a composition or other anti-arthropodal, fungicidal, virucidal, bactericidal, or synergistic components may be included.

The cyclic and noncyclic dithioketals of glyoxyloyl halide 1-phenylhydrazones can be readily formulated as dusts by grinding a mixture of the compound and a pulverulent carrier in the presence of each other. Grinding is conveniently accomplished in a ball mill, a hammermill, or by air-blast micronization. A suitable ultimate particle size is less than 60 microns. Preferably, 95% of the particles are less than 50 microns, and about 75% are 5 to 20 microns. Dusts of that degree of comminution are conveniently free-flowing and can be applied to animals, inanimate matter, fruit trees, crop plants, and soil so as to effect thorough distribution and coverage. Dusts are particularly adapted for effectively controlling insects and mites over wide areas when applied by airplane. They are also indicated for application to the undersides of plant foliage and to the skin of poultry and hairy animals (e.g., for ticks).

Representative suitable pulverulent carriers include the natural clays such as China, Georgia, Barden, attapulgus, kaolin, and bentonite clays; minerals in their natural forms as they are obtained from the earth such as talc, pyrophyllite, quartz, diatomaceous earth, fuller's earth, chalk, rock phosphates and sulfates, calcium carbonates, sulfur, silica and silicates; chemically modified minerals such as washed bentonite, precipitated calcium phosphate, precipitated calcium silicate, synthetic magnesium silicate, and colloidal silica; and organic flours such as wood, walnut shell, soybean, cottonseed, and tobacco flours, and free-flowing, hydrophobic starches.

Dusts can also be prepared by dissolving cyclic and noncyclic dithioketals of glyoxyloyl halide 1-phenylhydrazones in a volatile solvent such as methylene chloride, mixing the solution with a pulverulent carrier and evaporating the solvent.

The proportions of pulverulent carrier and cyclic and noncyclic dithioketals of glyoxyloyl halide 1-phenylhydrazones can vary over a wide range depending upon the arthropod pests to be controlled and the conditions of treatment. In general, dust formulations can contain up to about 90% (on a weight basis) of the active ingredient. Dusts having as little as 0.001% of the active ingredient can be used, but a generally preferred proportion is from about 0.50% to about 20% of active ingredient.

The dispersible powder formulations of this invention are prepared by incorporating a surfactant in a dust composition prepared as described above. When about 0.1% to about 12% of a surfactant is incorporated in a dust, the dispersible powder thus obtained is particularly adapted for further admixture with water for spraying on inanimate matter and products, fruit trees, field crops, soil and livestock. The dispersible powders can be admixed with water to obtain any desired concentration of active ingredient, and the mixture can be applied in amounts sufficient to obtain predetermined rates of application and uniform distribution. With this flexibility in mind, the dispersible powders of the invention can conveniently comprise preferably about 10% to about 80% of active ingredient.

Representative surfactants useful for preparing dispersible powder formulations of this invention include alkyl sulfates and sulfonates, alkyl aryl sulfonates, sulfosuccinate esters, polyoxyethylene sulfates, polyoxyethylenesorbitan monolaurate, alkyl aryl polyether sulfates, alkyl aryl polyether alcohols, alkyl naphthalene sulfonates, alkyl quaternary ammonium salts, sulfated fatty acids and esters, sulfated fatty acid amides, glycerol mannitan laurate, polyalkylether condensates of fatty acids, lignin sulfonates, and the like. The preferred class of surfactants includes blends of sulfonated oils and polyalcohol carboxylic acid esters (Emcol H–77), blends of polyoxyethylene ethers and oil-soluble sulfonates (Emcol H–400), blends of alkyl aryl sulfonates and alkylphenoxy polyethoxy ethanols (Tritons X–151, X–161, and X–171), e.g., about equal parts of sodium kerylbenzene sulfonate and isooctylphenoxy polyethoxy ethanol containing about 12 ethoxy groups, and blends of calcium alkyl aryl sulfonates and polyethoxylated vegetable oils (Agrimul $N_4S$). It will be understood, of course, that the sulfate and sulfonate surfactants suggested above will preferably be used in the form of their soluble salts, for example, their sodium salts. All of these surfactants are capable of reducing the surface tension of water to less than about 40 dynes per centimeter in concentrations of about 1% or less. The dispersible powder compositions can be formulated with a mixture of surfactants of the types indicated if desired.

A suitable dispersible powder formulation is obtained by blending and milling 327 lbs. of Georgia Clay, 4.5 lbs. of isooctylphenoxy polyethoxy ethanol (Triton X–100) as a wetting agent, 9 lbs. of a polymerized sodium salt of substituted benzoid long-chain sulfonic acid (Daxad 27) as a dispersing agent, and 113 lbs. of the active ingredient. The resulting formulation has the following percentage composition (parts herein are by weight unless otherwise specified).

| | Percent |
|---|---|
| Active Ingredient | 25 |
| Isooctylphenoxy polyethoxy ethanol | 1 |
| Polymerized sodium salt of substituted benzoid long-chain sulfonic acid | 2 |
| Georgia Clay | 72 |

This formulation, when dispersed in water at the rate of 10 lbs. per 100 gals., gives a spray formulation containing about 0.3% (3000 p.p.m.) active ingredient which can be applied to arthropods, plants, buildings or other arthropod habitats, or arthropod foods to control arthropod pests including, for example, insects, mites, ticks, and spiders.

If desired, dispersants such as methyl cellulose, polyvinyl alcohol, sodium ligninsulfonates, and the like can be included in the dispersible powder formulations of this invention. Adhesive or sticking agents such as vegetable oils, naturally occurring gums, casein, and others can also be included. Corrosion inhibitors such as epichlorohydrin and anti-foaming agents such as stearic acid can also be included.

The anti-arthropodal cyclic and noncyclic dithioketals of glyoxyloyl halide 1-phenylhydrazones of this invention can be applied to arthropod pests, objects, or situs in aqueous sprays without a solid carrier. Since, however, the comopunds themselves are relatively insoluble in water they are preferably dissolved in a suitable inert organic solvent carrier. Advantageously, the solvent carrier is immiscible with water so that an emulsion of the solvent carrier in water can be prepared. If, for example, a water-miscible solvent carrier such as ethanol is used the solvent carrier will dissolve in the water and any excess cyclic and noncyclic dithioketals of glyoxyloyl halide 1-phenylhydrazone will be thrown out of solution. In an oil-in-water emulsion, the solvent phase is dispersed in the water phase and the dispersed phase contains the active ingredient. In this way, uniform distribution of a water insoluble active ingredient is achieved in an aqueous spray. A solvent carrier in which cyclic and noncyclic dithioketals of glyoxyloyl halide 1-phenylhydrazones are highly soluble is desirable so that relatively high concentrations of active ingredient can be obtained. Sometimes, one or more solvent carriers with or without a cosolvent can be used in order to obtain concentrated solutions of the active ingredient, the main consideration being to employ a water-immiscible solvent for the active ingredient that will hold the compound in solution over the range of concentrations useful for applying to insects, mites, spiders, and ticks.

The emulsifiable concentrates of the invention are prepared, therefore, by dissolving the active ingredient and a surfactant in a substantially water-immiscible solvent carrier (i.e., a solvent carrier which is soluble in water to the extent of less than 2.5% by volume at temperatures of the order of 20° to 30° C.), for example, cyclohexanone, methyl propyl ketone, summer oils, ethylene dichloride, aromatic hydrocarbons such as benzene, toluene, and xylene, and high-boiling petroleum hydrocarbons such as kerosene, diesel oil, and the like. If desired, a cosolvent such as methyl ethyl ketone, acetone, isopropanol, and the like can be included with the solvent carrier in order to enhance the solubility of the active ingredient. Aqueous emulsions are then prepared by mixing with water to give any desired concentration of active ingredient. The surfactants which can be employed in the aqueous emulsions of the invention are those types noted above. Mixtures of surfactants can be employed, if desired.

Advantageously, the concentration af active ingredient in the emulsifiable concentrates can range from about 5% to about 50% by weight, preferably from about 10% to about 40%. A concentrate comprising 20% (by weight) of the compound dissolved in a water-immiscible solvent of the kind noted above can be admixed with an aqueous medium in the proportions of 13 ml. of concentrate with 1 gal. of medium to give a mixture containing 700 parts of active ingredient per million parts of liquid carrier. Similarly, 1 qt. of a 20% concentrate mixed with 40 gals. of water provides about 1200 p.p.m. (parts per million) of active ingredient. In the same manner, more concentrated solutions of active ingredient can be prepared.

The concentrate compositions of the invention which are intended for use in the form of aqueous dispersions or emulsions can also comprise a humectant, that is to say, an agent which will delay the drying of the composition in contact with material to which it has been applied. Suitable humectants include glycerol, diethyelne glycol, solubilized lignins, such as calcium ligninsulfonate, and the like.

The granular compositions of this invention are convenient for application to soil or around buildings when persistence is desired. Granulars are readily applied broadcast or by localized, e.g., in-the-row applications. The individual granules may be any desired size from 30 to 60 mesh up to 20 to 40 mesh, or even larger. Granulars are prepared by dissolving the active compound in a solvent such as methylene chloride, xylene, or acetone and applying the solution to a quantity of a granulated absorbent carrier. Representative granulated absorbent carriers include ground corn cobs, ground walnut shells, ground peanut hulls, and the like. If desired, the impregnated granulated absorbent carrier can be coated with a coating that will preserve the integrity of the granular until it is applied to an object or situs favorable for release of the active ingredient.

The rates of application to arthropod pests, objects, or situs will depend upon the species of arthropods to be controlled, the presence or absence of desirable living organisms, temperature conditions of treatment, and the method and efficiency of application. In general, anti-arthropodal activity is obtained when the compounds are applied at concentrations of about 10 to about 6000 p.p.m., preferably at concentrations of about 30 to about 4000 p.p.m.

he compositions containing cyclic and noncyclic dithioketals of glyoxyloyl halide 1-phenylhydrazones according to the invention, can be applied to arthropod pests, objects or situs by conventional methods. For example, animals, an area of soil, a building, or vegetation can be treated by spraying wettable powder suspensions, emulsions, or solutions from power sprayers or from hand-operated knapsack sprayers. Dips can be used for livestock. Dusts can be applied by power dusters, or by hand-operated dusters. Creams and ointment formulations can be applied to skin or objects for prolonged protection from arthropod pests.

The active compounds of the invention can also be formulated in relatively dilute proportions in a dispersible insecticide carrier for household applications. Thus, the active compounds can be formulated in dusts having from about 0.1% to 5.0% active ingredient with a dusting powder as hereinbefore described, and in solutions containing from about 0.01% to about 5.0% active ingredient with deodorized kerosene for aerosol applications.

It will of course be appreciated that the conditions encountered when applying the method and compositions of this invention to actual practice can vary widely. Included among the variables that may be encountered are the degree of infestation by the pestiferous arthropods, the particular Class, Order and species to be controlled, the particular situs being treated, the age or degree of development of desirable animals or plants, the prevailing weather conditions, such as temperature, relative humidity, rainfall, dews, and so forth.

The compounds of Formula I are effective pesticides that can be used to control invertebrate pests in agriculture, in industry, and around the home. The compounds have been found to be active against invertebrate animals of the Phylum Arthropoda, illustratively Class Insecta, for example, order Coleoptera, more specifically, the cotton boll weevil (*Anthonomus grandis* Boheman), the confused flour beetle (*Tribolium confusum* Jacquelin de Val), and the Mexican bean beetle (*Epilachna varivestis* Mulsant), order Diptera, more specifically, the housefly (*Musca domestica* Linnaeus), order Orthoptera, more specifically, the house cricket (*Acheta domesticus* Linnaeus), and the German cockroach (*Blatella germanica* Insecta, for example, order Coleoptera, more specifically, Southern armyworm (*Prodenia eridania* Cramer), and Class Arachnida, for example, order Acarina, more specifically, the two-spotted spider mite (*Tetranychus ulticae* Koch).

Efficacy against arthropod pests has been demonstrated at concentrations of 1000, 500, 100, 50 and even 10 p.p.m. depending upon the specific arthoropod used. Some invertebrate animal pests will be more sensitive to the compounds than others, and others might be quite resistant. In general, the compounds of Formula I are used at concentrations ranging from about 30 to about 6000 p.p.m.

I claim:
1. An anti-arthropodal composition comprising a dispersible carrier and as the characterizing active ingredient an effective anti-arthropodal amount of a dithioketal of glyoxyloyl halide 1-phenylhydrazone of the formula:

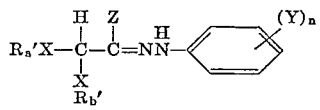

wherein $R_a'$ and $R_b'$ are independently lower-alkyl of from 1 to 4 carbon atoms, inclusive; Y is selected from the group consisting of halogen, lower-alkyl of from 1 to 4 carbon atoms, inclusive, lower-haloalkyl of from 1 to 4 carbon atoms, inclusive, lower-alkoxy of from 1 to 4 carbon atoms, inclusive, and lower-alkylmercapto of from 1 to 4 carbon atoms, inclusive; n is an integer from 0 to 5, inclusive; Z is chlorine or bromine, and X is a sulfur group selected from the group consisting of sulfide, sulfinyl, and sulfonyl.

2. The composition according to claim 1 wherein $R_a'X$ and $R_b'X$ are methylthio.

3. The composition according to claim 2 wherein the characterizing active ingredient is bis(methylthio)acetyl chloride (2,4,6-trichloro-m-tolyl)hydrazone.

4. The composition according to claim 1 further comprising a surfactant.

5. The composition according to claim 4 wherein the dispersible carrier is particulate matter.

6. The composition according to claim 4 wherein the dispersible carrier is a liquid.

7. A method for controlling arthropod pests with a dithioketal of glyoxyloyl halide 1-phenylhydrazone of the formula:

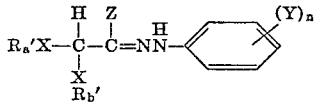

wherein $R_a'$ and $R_b'$ are independently lower-alkyl of from 1 to 4 carbon atoms, inclusive; Y is selected from the group consisting of halogen, lower-alkyl of from 1 to 4 carbon atoms, inclusive, lower-haloalkyl of from 1 to 4 carbon atoms, inclusive, lower-alkoxy of from 1 to 4 carbon atoms, inclusive, and lower-alkylmercapto of from 1 to 4 carbon atoms, inclusive; n is an integer from 0 to 5, inclusive; Z is chlorine or bromine, and X is a sulfur group selected from the group consisting of sulfide, sulfinyl, and sulfonyl, which comprises contacting said pests with an effective anti-arthropodal amount of said dithioketal of glyoxyloyl halide 1-phenylhydrazone.

8. The method according to claim 7 wherein Z is chlorine.

9. The method according to claim 8 wherein at least one Y is chlorine.

10. The method according to claim 9 wherein lower-alkylthio is methylthio.

11. The method according to claim 10 wherein the control of arthropod pests is accomplished with bis(methylthio)acetyl chloride (2,4,6-trichloro-m-tolyl)hydrazone.

References Cited

UNITED STATES PATENTS

| | | | |
|---|---|---|---|
| 2,690,988 | 10/1954 | Jones et al. | 424—277 |
| 2,818,367 | 12/1957 | Jaworski et al. | 424—327 |
| 3,338,782 | 8/1967 | Addor | 424—277 |

VINCENT D. TURNER, Primary Examiner

U.S. Cl. X.R.

260—327 M, 566 B; 424—277